United States Patent
Baskin et al.

(10) Patent No.: US 6,846,012 B2
(45) Date of Patent: Jan. 25, 2005

(54) CHILD SEAT SENSOR ASSEMBLY

(75) Inventors: Gennady Baskin, Sharon, MA (US); Kayvan Hedayat, Weston, MA (US)

(73) Assignee: Stoneridge Control Devices, Inc., Canton, MA (US)

( * ) Notice: Subject to any disclaimer, the term of this patent is extended or adjusted under 35 U.S.C. 154(b) by 0 days.

(21) Appl. No.: 10/714,456

(22) Filed: Nov. 14, 2003

(65) Prior Publication Data

US 2004/0149507 A1 Aug. 5, 2004

Related U.S. Application Data

(63) Continuation of application No. PCT/US02/15354, filed on May 15, 2002.
(60) Provisional application No. 60/291,116, filed on May 15, 2001.

(51) Int. Cl.$^7$ ............................................. B60R 21/32
(52) U.S. Cl. ...................................................... 280/735
(58) Field of Search ............................ 280/735, 801.1; 180/268

(56) References Cited

U.S. PATENT DOCUMENTS

| 5,468,014 A | 11/1995 | Gimbel et al. |
| 5,690,356 A | 11/1997 | Lane, Jr. |
| 5,851,025 A | 12/1998 | Gamboa |
| 5,992,879 A | 11/1999 | Bogge |
| 6,175,304 B1 | 1/2001 | Becker |

Primary Examiner—Eric Culbreth
(74) Attorney, Agent, or Firm—Grossman, Tucker, Perreault & Pfleger, PLLC

(57) ABSTRACT

A sensor assembly for sensing attachment of an object to a safety bar in a vehicle. The assembly may include a movable portion positioned to move from a first position to a second position upon attachment of the object to the safety bar, and a sensor adjacent the movable portion for providing a first output when the movable portion is in the first position and a second output when the sensor is in the second position. The attachment member may allow pivotal movement of the assembly relative to the safety bar to accommodate the orientation of the object to be attached to the safety bar. A method of modifying deployment force of an airbag upon attachment of a child safety seat to safety bar in a vehicle is also provided.

12 Claims, 6 Drawing Sheets

CHILD SEAT SENSOR ASSEMBLY

CROSS-REFERENCE TO RELATED APPLICATIONS

This application is a continuation of International Application Ser. No. PCT/US02/15354, filed May 15, 2002 and designating the United States, and claims the benefit of the filing date of U.S. Provisional Application Ser. No. 60/291,116, filed May 15, 2001, the teachings of which applications are incorporated herein by reference.

FIELD OF THE INVENTION

The present invention relates generally to a sensor and system for sensing the presence of a child safety seat and limiting or disabling an associated air bag.

BACKGROUND OF THE INVENTION

New vehicles may be equipped with rigid safety bars affixed to the floor of the vehicle or assembled as an integral part of the seat between the top and bottom seat cushions. A car safety seat may be equipped with a mechanism, such as an attachment bar or tether strap, to secure to the rigid safety bar. As such, this provides an additional mechanism for securing a child safety seat in addition to the typically utilized vehicle seat belt. Such a safety bar may be an ISOFIX wire attachment. Safety Associations around the world are requiring such safety bars to be installed in newer vehicles. It is expected that by 2003 to 2004 every new vehicle will be equipped with such a safety bar.

There is concern for child safety when an air bag deploys into a forward facing child safety seat. In such instances, the air bag may cause considerable harm to the front facing child. Accordingly, there is a need in the art for a sensor that detects when a child safety seat is installed. Upon sensing the presence of such a child seat, a proper control signal is sent to the vehicle control system in order to limit or prevent deployment of the air bag.

SUMMARY OF THE INVENTION

According to one aspect of the invention, a sensor assembly for sensing attachment of an object to a safety bar in a vehicle includes: a movable portion positioned to move from a first position to a second position upon attachment of the object to the safety bar; and a sensor adjacent the movable portion for providing a first output when the movable portion is in the first position and a second output when the sensor is in the second position. The assembly may include at least one attachment member for removably affixing the assembly to the safety bar. The attachment member may allow pivotal movement of the assembly relative to the safety bar to accommodate the orientation of the object to be attached to the safety bar.

According to another aspect of the invention, a method of modifying deployment force of an airbag upon attachment of a child safety seat to safety bar in a vehicle includes: providing a sensor assembly consistent with the invention, and providing the first and second outputs of the sensor assembly to an airbag controller for modifying the deployment force in response to the second output. The method may further include pivotally attaching the sensor assembly to the safety bar, and/or attaching the sensor assembly to the safety bar to prevent protrusion of the assembly into the passenger compartment.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Figure 1:
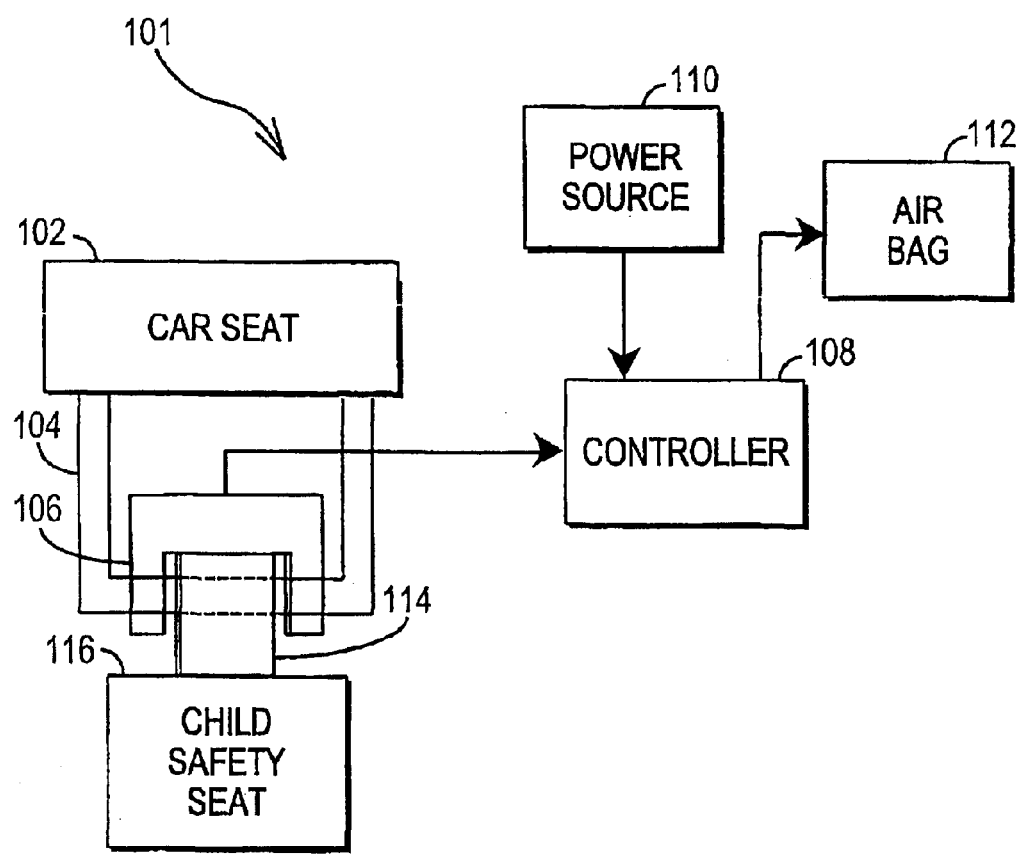
FIG. 1 is a block diagram of an exemplary child seat sensor system consistent with the present invention.

Referring to FIG. 1, there is illustrated a block diagram of an exemplary child seat sensor system 101 consistent with the present invention. A safety bar, e.g., an ISOFIX wire 104, may be installed and affixed permanently to the chassis of the vehicle or to the car seat 102. When affixed to the car seat 102, the safety bar 104 is typically located between the top and bottom car seat cushions. As known to those skilled in the art, there may be one or more such safety bars 104 installed in each car seat.

Advantageously, an exemplary sensor 106 consistent with the present invention is affixed to the safety bar 104. The sensor 106 senses whether an attachment mechanism 114, e.g. an attachment bar or tether strap, of a child safety seat 116 is affixed to the safety bar 104. When a child safety seat 116 is attached to the safety bar 104 via the attachment mechanism 114, the sensor 106 provides an appropriate control signal to an air bag controller 108. Such a controller 108 is known to those skilled in the art and may comprise state machine type logic and/or a microprocessor programmed to generate various control signals.

Upon receiving an appropriate control signal from the sensor 106, the controller 108 disables or limits deployment of an air bag 112 associated with the seat to which the child safety seat 116 is attached. The controller may reduce the intensity or power of the air bag deployment so that a child in such a safety seat would not be injured if such air bag deployed. Hence, the air bag for that seat would be limited or disabled if the car encountered a condition, e.g. a collision, which would normally deploy the air bag. Once the car seat and hence the mechanism attachment to the safety bar 104 is removed, a control signal from the sensor 106 to the controller 108 indicates that normal air bag operation could resume. Electric power for the system is provided by a power source 110, e.g. a car battery.

Figure 2:
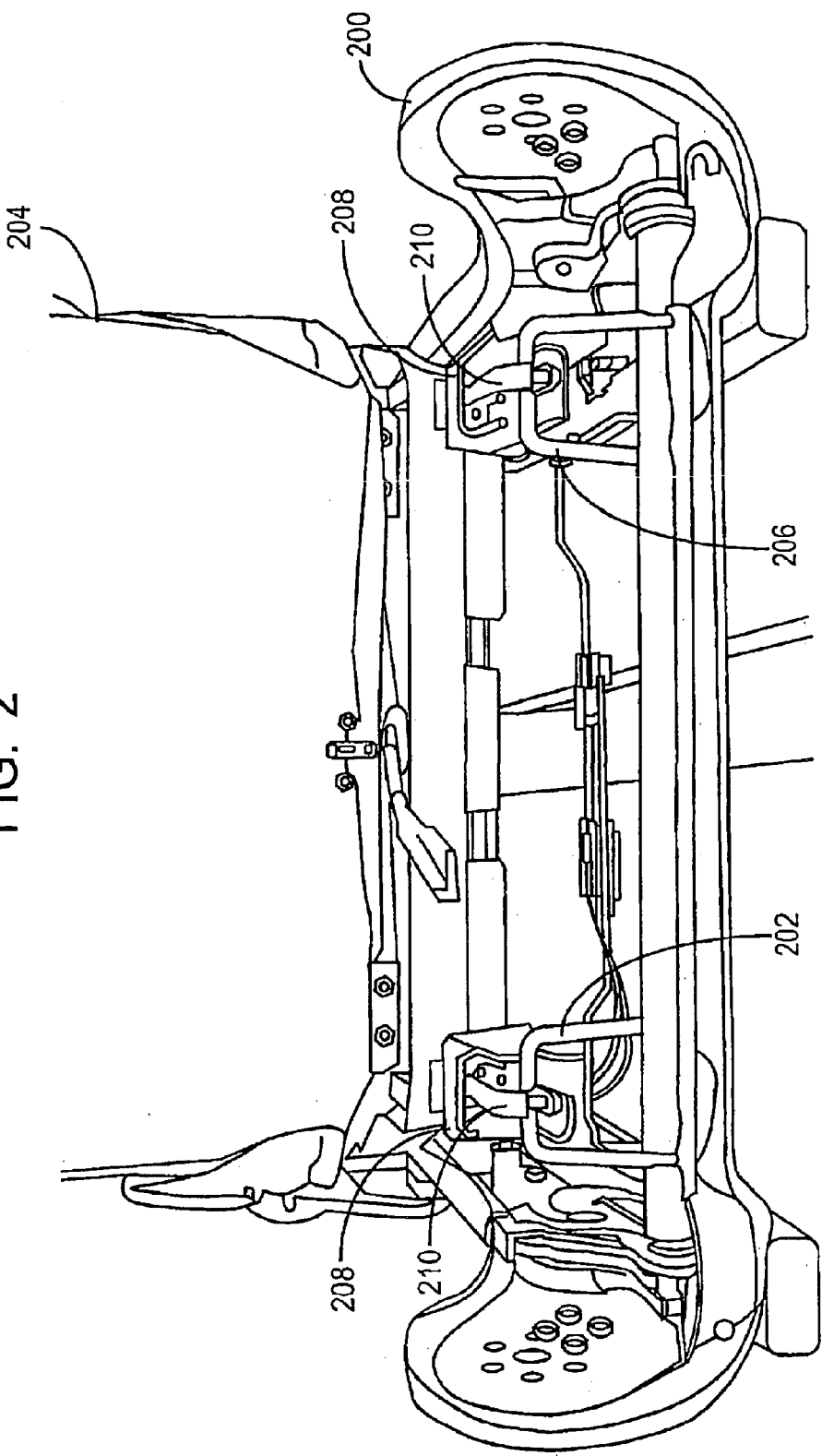
FIG. 2 is a view of an exemplary rigid safety bar attachment and sensor combination consistent with the invention.

Turning to FIG. 2, a view of the rear of a car seat frame 200 with two exemplary safety bars 202 and 206 on opposite ends of the frame is illustrated. Each safety bar 202, 206 in this exemplary configuration is a generally u-shaped ISOFIX bar of approximately 6 mm in diameter. A sensor 208 consistent with the present invention is affixed to the safety bar 202. A child safety seat 204 having first and second attachment bars 210 affixed thereto is secured to the safety bars by engagement of the attachment bars 210 with the safety bars 202, 206. Either one or two sensors may be utilized when two or more safety bars are utilized. The safety bars 202 and 206 in the exemplary embodiment of FIG. 2 fit in between the lower and upper seat cushions in a typical car seat. Those skilled in the art will recognize that the sensor could be attached to any rigid mechanism near the applicable car seat without departing from the scope of the present invention.

Figure 3:
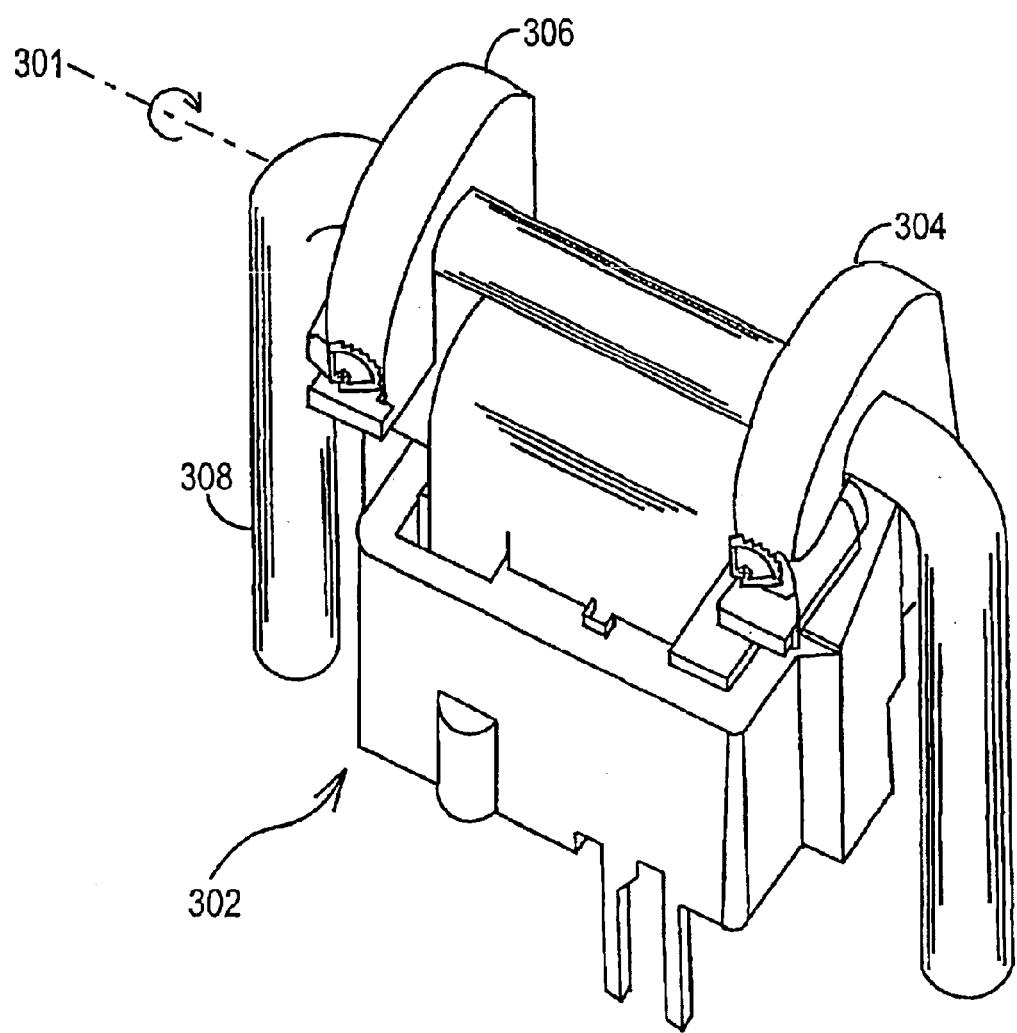
FIG. 3 is an isometric view of an exemplary sensor consistent with the present invention attached to a rigid safety bar.

Turning to FIG. 3, an isometric view of an exemplary sensor 302 consistent with the present invention attached to a safety bar 308 is illustrated. A pair of attachment members 304 and 306 may be used to affix the sensor 302 to the safety bar 308. Advantageously, the attachment members 304 and 306 permit 360-degree rotation of the sensor about an axis of rotation 301. This enables the sensor to hinge or rotate about the same axis as a reclining upper seat cushion. In addition, this also allows for easy installation in a variety of configurations. The sensor may also be readily affixed to existing support bars in existing vehicles.

Figure 4:
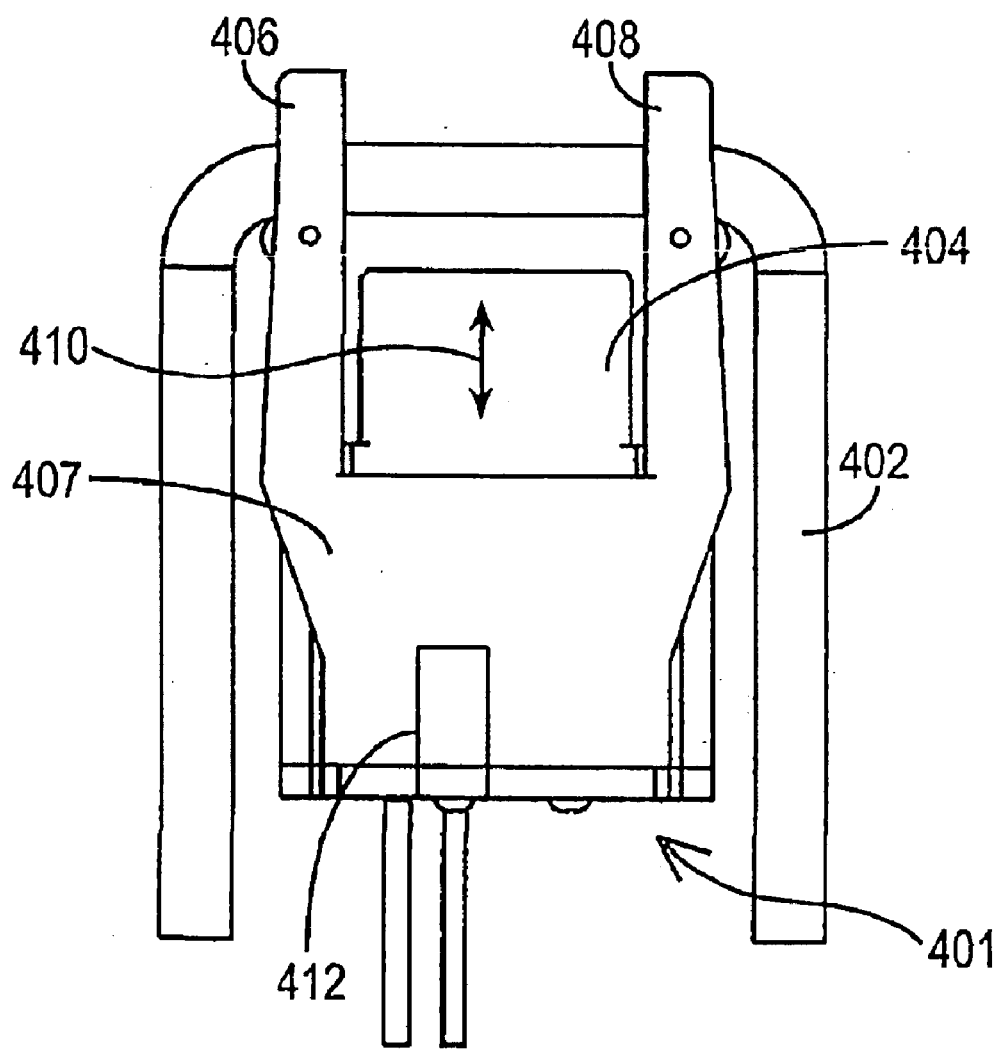
FIG. 4 is a plan view of an exemplary sensor consistent with the invention.

Turning to FIG. 4, a plan view of an exemplary sensor 401 consistent with the invention is illustrated. Attachment members 406 and 408 affix the sensor 401 to the safety bar 402. A portion 404 of the sensor is configured to move in a direction parallel to the longer legs of the safety bar 402 as indicated by a direction arrow 410. When an attachment mechanisms e.g. a child seat attachment bar, is affixed to the safety bar 402 between the attachment members 406,408, the attachment mechanism depresses the portion 404. When the attachment mechanism is removed, the portion 404 returns to its default position, e.g. as illustrated in FIG. 4.

The sensor may incorporate solid-state sensor technology such as a Hall sensor 412 to sense movement of the portion 404 and, thus, the connection of the child seat attachment mechanism to the safety bar. Hall Sensors, as known by those skilled in the art, are non-contact sensors, and may be connected to the vehicle controller in a two-wire configuration. In addition or in the alternative, those skilled in the art will recognize, however, that a variety of sensing means may be used. For example, optical, magneto-resistive, fluxgate sensors etc. may be useful in connection with a sensor consistent with the present invention. It is to be understood, therefore, that the embodiments described herein are described by way of illustration, not of limitation.

In an embodiment including a Hall sensor, e.g. sensor 412, the portion 404 may include a magnetic actuator. When the portion 404 is depressed upon attachment of an attachment mechanism to the safety bar, the Hall sensor may provide an output to the controller causing modification of airbag deployment. When the portion 404 is not depressed, i.e. not attachment mechanism is affixed to the safety bar, the Hall sensor may provide a different output allowing full deployment of the airbag.

Advantageously, the sensor 401 and its attachment members 406 and 408 may be configured to accept a variety of standard safety bars 402 including standard ISOFIX child seat connectors. The configuration also requires only a relatively small opening when the rigid support member is located beneath the bottom and top seat cushions. As such, the opening is visually non-intrusive to passengers of the vehicle. Also, the sensor 401 may hinge around the rigid support bar 402 in order to comply with the orientation of the child seat connector mechanism, e.g., an attachment bar or tether strap. Advantageously, the sensor can be assembled and attached to the safety bar after the safety bar is already affixed to the vehicle floor or seat. The sensor may also include robust mechanical packaging 407 to ensure that the sensor can withstand harsh operating conditions. The sensor 401 may also be located and configured such that service can be performed on the sensor after installation.

The sensor may also have drain slots to drain foreign liquids that may enter the sensor. The sensor configuration is very flexible in that it may be used on any vehicle with little modification, on any front or back seat using a rigid support bar, and with multiple child seat attachments available from a host of various child safety seats. The sensor can also be configured with integrated connector or wire harness. Also, the integrated connector may be limited in size so as not to protrude into the passenger compartment of the vehicle. The sensor may also incorporate an opening that may be made of plastic to capture the safety bar, e.g. an ISOFIX bar, child seat attachment specified by Safety Associations.

Figure 5:
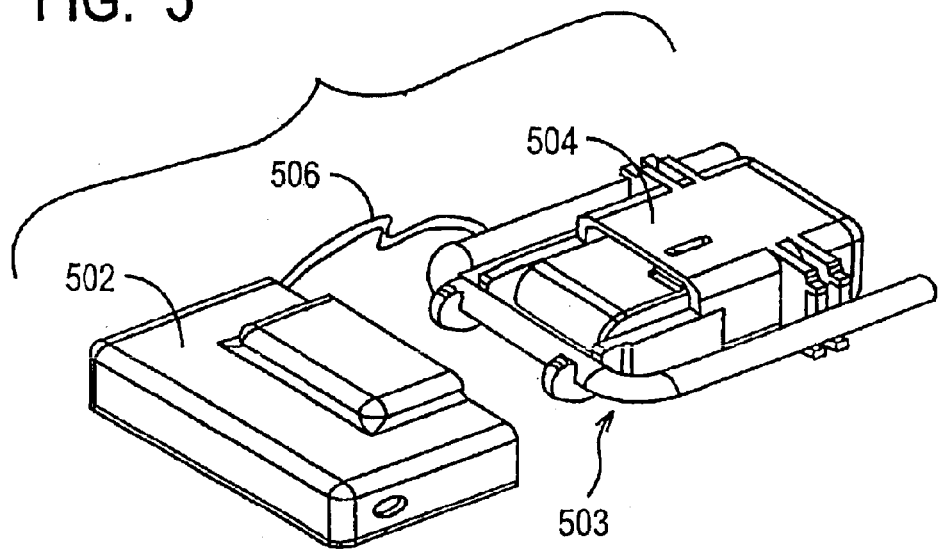
FIG. 5 illustrates an exemplary cover that may be utilized with a sensor consistent with the present invention.
Figure 6:
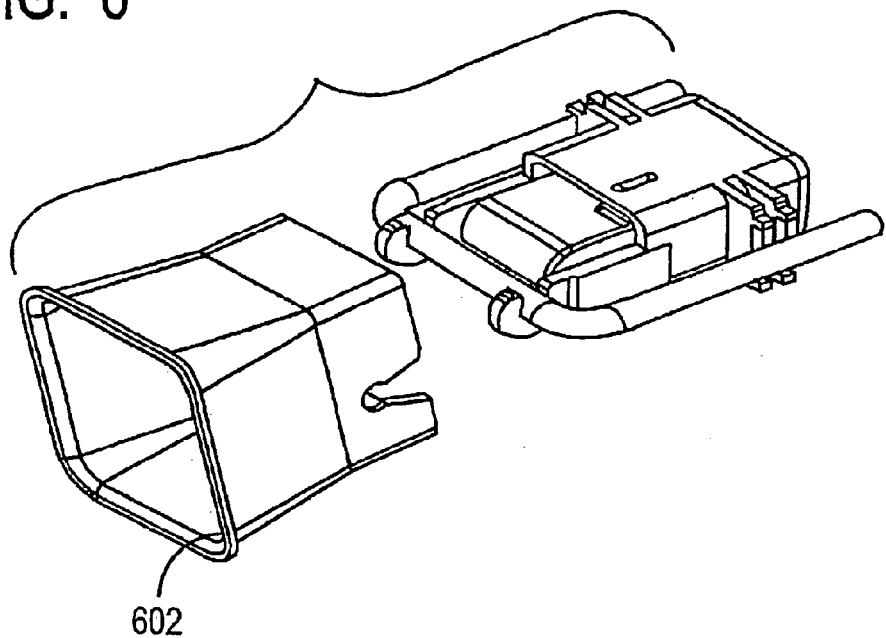
FIG. 6 illustrates a funnel that may be used with a sensor consistent with the present invention to ensure ease of assembly during attachment of a child safety seat.

Turning to FIG. 5, there is illustrated an exemplary cover 502 that may be utilized with a sensor 504 consistent with the present invention. The cover 502 may be affixed to the front portion 503 of the sensor 504 to protect the sensor 502 from various foreign objects that may enter when the child car seat is not in use. The operator of the vehicle will remove the cover 502 before installing the car seat. In addition, the cover 502 may also include an attachment 506, e.g., a tether strap, to the sensor to insure the cover 502 is not lost when a child car seat is not in use. As shown in FIG. 6, when the cover 502 illustrated in FIG. 5 is removed an attachable funnel 602 may be utilized to insure ease of assembly during attachment of a child car seat.

Figures 7A, 7B:
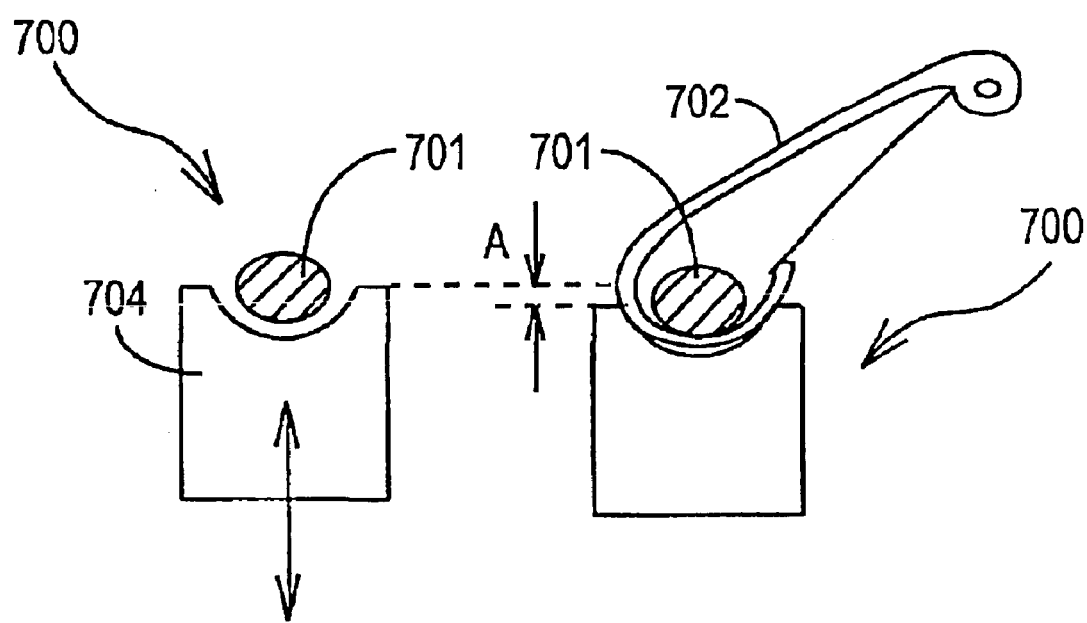
FIG. 7A illustrates a dog style leash attachment configuration of a sensor consistent with the present invention in a position wherein the dog style leash is unattached to a safety bar.
FIG. 7B illustrates a dog style leash attachment configuration of a sensor consistent with the present invention in a position wherein the dog style leash is attached to a safety bar.

FIG. 7A illustrates a dog style leash attachment configuration 700 of a sensor consistent with the present invention in a position wherein the dog style leash is unattached to a safety bar 701. FIG. 7B illustrates a dog style leash attachment configuration of a sensor consistent with the present invention in a position wherein the dog style leash 702 is attached to a safety bar 701. As shown in a configuration for sensing a typical dog style leash 702, a movable portion 704 of the sensor may be configured with a stroke A that is larger then the thickness of the leash 702.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A sensor assembly for sensing attachment of an object to a u-shaped safety bar affixed to a vehicle, said safety bar having an attachment portion extending between first and second leg portions, said assembly comprising:

at least one attachment member configured to affix said sensor assembly to said attachment portion of said safety bar;

a movable portion configured to engage said object and move from a first position to a second position upon direct attachment of said object to said attachment portion of said safety bar; and a sensor for providing a first output when said movable portion is in said first position and a second output when said sensor is in said second position.

2. A sensor assembly according to claim 1, wherein said at least one attachment member is configured to allow pivotal attachment of said assembly to said attachment portion of said safety bar.

3. A sensor assembly according to claim 2, wherein said sensor assembly comprises first and second spaced ones of said attachment members.

4. A sensor assembly according to claim 2, wherein said at least one attachment member allows positioning of said sensor assembly between said first and second leg portions of said safety bar.

5. A sensor assembly according to claim 1, wherein said sensor comprises a Hall effect sensor.

6. A sensor assembly for sensing attachment of an object to a generally u-shaped safety bar in a vehicle, said sensor comprising:
   first and second attachment members for pivotally attaching said assembly to said generally u-shaped safety bar, said first and second attachment members spaced to allow attachment of said object to said safety bar at a location between said first and second attachment members;
   a movable portion disposed between said attachment members for positioning adjacent said safety bar to engage said object and move from a first position to a second position upon direct attachment of said object to said safety bar; and
   a sensor adjacent said movable portion for providing a first output when said movable portion is in said first position and a second output when said sensor is in said second position.

7. A sensor assembly according to claim 6, wherein said first and second attachment members allow positioning of said sensor assembly between said first and second leg portions of said safety bar.

8. A sensor assembly according to claim 6, wherein said sensor comprises a Hall effect sensor.

9. A method of sensing attachment of a child safety seat to a u-shaped safety bar affixed to a vehicle, said safety bar having an attachment portion extending between first and second leg portions, said method comprising:
   affixing a sensor assembly to said attachment portion, said sensor assembly comprising a movable portion configured to engage an attachment member of said child safety seat and move from a first position to a second position upon direct attachment of said attachment member to said attachment portion of said safety bar; and a sensor for providing a first output when said movable portion is in said first position and a second output when said sensor is in said second position.

10. A method according to claim 9, wherein said affixing step comprises pivotally affixing said sensor assembly to said attachment portion.

11. A method according to claim 9, wherein said affixing step comprises pivotally affixing said sensor assembly to said attachment portion to allow said assembly to extend between said first and second leg portions of said safety bar.

12. A method according to claim 9, wherein said sensor comprises a Hall effect sensor.

* * * * *